Dec. 30, 1958    E. P. NICHOLSON    2,866,319
DRAINAGE ASSEMBLY
Filed Sept. 7, 1954
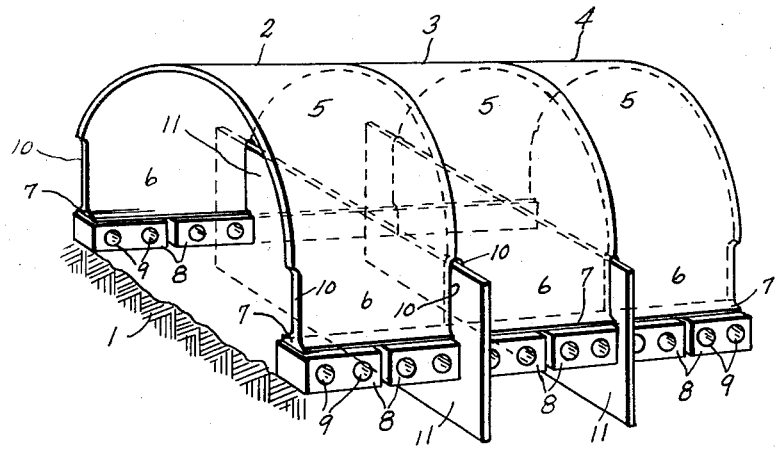
Fig.-1.
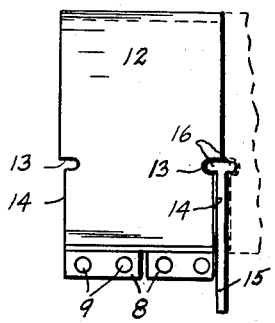 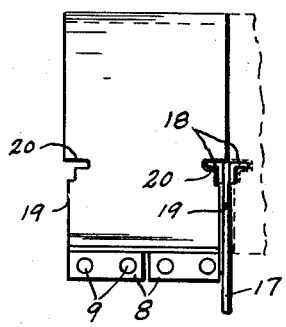 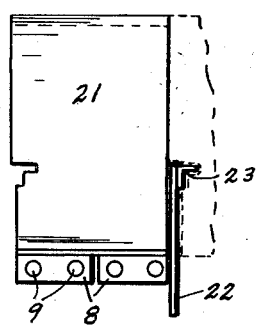
Fig.-2.    Fig.-3.    Fig.-4.
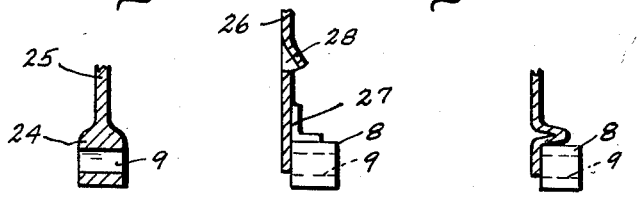
Fig.-5.    Fig.-6.    Fig.-7.
INVENTOR.
Edward P. Nicholson
BY
Charles S. Penfold
ATTORNEY United States Patent Office 2,866,319
Patented Dec. 30, 1958

2,866,319

DRAINAGE ASSEMBLY

Edward P. Nicholson, Gary, Ind.

Application September 7, 1954, Serial No. 454,572

4 Claims. (Cl. 61—11)

This invention relates generally to means for promoting the disposal of waste products and more particularly is directed to an improved structural unit, assembly and/or system adapted for use in cojunction with a septic tank, waste trap, and the like for carrying off the effluent and/or sludge emanating therefrom.

The conventional setup for this purpose customarily comprises a plurality of tubular cylindrical lengths of tile which are laid end to end so that the waste products may flow therethrough and between the joints to allow for dissipation of the effluent into the soil. This particular conventional arrangement has not proven entirely satisfactory because the sludge, within a relatively short period of time, usually seals or clogs the joints between the tile and thereby prevents the effluent from flowing laterally into the soil. Also, due to the small size of each tile a great many are required and this necessitates digging an exceedingly long trench or trenches. Furthermore, the character of the soil, its slope, and sidewalks, shrubbery and the like thereon, ofttimes makes it quite difficult or impossible to dig trenches and lay tile where required. Moreover, conventional tile extending from a septic tank or trap should be laid in a declining arrangement therefrom to promote drainage, and if one tile is not properly laid so that, for example, it tilts upwardly from the direction that the effluent flows, the system will not function.

With the foregoing in mind, one of the principal objects of the invention is to provide a structural unit, assembly and/or system which overcomes the disadvantages inherent in the use of conventional tile as above alluded to.

More specifically, an important object of the invention is to provide a strong and durable structural unit which is generally of channel shape or arched and provided with feet or rests having transverse apertures therein through which the waste products may flow laterally outwardly from the units to promote dissipation or seepage thereof into the soil.

A particular object of the invention is to place a plurality of units of the kind above described in the bottom of a shallow trench in an end to end relationship with baffles between the ends of the units so as to form a plurality of settling chambers, basins or beds whereby the waste or effluent will readily seep into the soil. The arrangement is such that the bed directly adjacent to a septic tank will first receive the greater part of the waste products while those extending therefrom will successively receive lesser amounts. In other words, the system offers a means whereby sludge or effluent retained in each settling bed will progressively diminish as the effluent travels through the system. In some instances several units of a system may be sufficient to promptly and efficiently dispose of the waste and if these units tend to become less efficient, those farther on will gradually assume the burden of removing the effluent and/or sludge. This method or treatment of causing the sludge and/or effluent to successively flow over a plurality of settling beds or basins offers advantages over the conventional setup in which all of the tile in the system receive substantially the same amount of sludge and consequently becomes more or less inoperative at the same time due to the sealing effect of the sludge.

A specific object of the invention is to provide the end edges of the structural unit with notches so that when the units are laid end to end in abutting relationship, corresponding openings will be provided to receive baffles. The baffles and openings are preferably of such a size that the baffles extend downwardly into the soil constituting the bottom of the trench in which the units are laid and also outwardly from the units so as to provide a plurality of independent settling beds. The arrangement is also preferably of such a character that some of the waste products may flow laterally outward through the openings.

A significant object of the invention is to provide a structural unit of a type which can be readily manufactured in various standard sizes to meet different installation requirements. For example, a unit can be made to approximate a size of 8 inches high, 12 inches wide and of different lengths, such as 16 inches, 20 inches and 24 inches, for use in transmitting fluid waste products from a septic tank or trap to a distant point or points. Also, if found desirable, a unit can be made to approximate a size of 30 inches high, 32 inches wide and 32 inches in length so that one or a few units can be utilized as a dry well.

An additional object of the invention is to provide a disposal or drainage system which will render efficient service for a longer period of time than the conventional system and one which can be readily cleaned when necessary.

Another object of the invention is to provide a drainage system comprising a trench made in soil, a plurality of corresponding arch shaped units laid end to end on the bottom of the trench, and a plurality of baffles interposed between the ends of the units and extending into the soil below the units and outwardly from the units to provide settling basins for successively receiving fluid adapted to flow in the system.

Another object of the invention is to provide an assembly for promoting drainage comprising a plurality of arch shaped units laid end to end to form a passage, and baffles respectively interposed transversely between certain of the units to provide settling basins for fluid adapted to flow through the passage.

A further object of the invention is to provide a structural unit which offers many advantages with respect to design and construction, cost and manufacture.

Other objects and advantages of the invention will become apparent after the description hereinafter set forth is considered in conjunction with the drawing annexed hereto.

In the drawings:

Figure 1 is a perspective view showing the manner in which a number of structural units above referred to are laid in a trench;

Figure 2 is a modification of a structural unit, including a different form of baffle which is connected between and to the units;

Figures 3 and 4 illustrate different forms of structural units and baffles suitable for use therewith;

Figure 5 is a modified form of a portion of a structural unit showing the rests formed integrally with the unit;

Figure 6 is a partial view of a different form of structural unit adapted for support on a separate rest or rests; and Figure 7 is a partial view of another form of structural unit adapted for support on a separate rest or rests.

Referring first to the structure exemplified in Figure 1 of the drawing, numeral 1 represents soil constituting the bottom of a trench in which a plurality of corresponding structural units 2, 3 and 4 are laid. Although only three units are illustrated in Figure 1, it is to be understood that the number employed depends on the requirements or capacity of the installation.

Each of the structural units is preferably made in the form of a channel or is arched as shown to include a curved or arcuate top wall 5 and a pair of upstanding substantially parallel side walls 6. It may be stated that each unit is generally substantially semi-cylindical in form. The side walls of each unit are preferably flanged to provide feet 7 which are mounted on two pairs of rests 8, one pair for each foot. Although two pairs of rests are shown as being provided for each structural unit it is to be understood that two units or more than two pairs may be employed if so desired. Two pairs, however, are preferably utilized and the rests in each pair are so spaced that the effluent and/or sludge may flow outwardly through the spaces as well as through transverse holes 9 provided in each of the rests. The rests are preferably of sufficient size to provide a suitable support for the structural units and the structural units are preferably of such a configuration that they will withstand excessive pressures from above.

Each side wall 6 of each unit is preferably interrupted by a pair of vertically disposed notches 10 so that the opposed notches in an adjacent pair of units will provide a pair of openings which receive a baffle 11 of generally rectangular shape as clearly illustrated. It will be noted that the pairs of rests are also spaced apart so that a baffle will extend outwardly therebetween. The openings formed by the notches and the size of the baffles are so constructed that the baffles will extend downwardly several inches into the soil constituting the bottom of the trench and will also extend laterally outward beyond the structural units so as to provide a plurality of settling beds, chambers or basins. If found desirable, the height of any baffle may be varied so that the upper portion of one baffle may be lower than the upper edge of an adjacent baffle. However, the upper edges of the baffles are preferably disposed at substantially the same level and at an elevation approximating one half the height of the pssage formed by the units.

In view of the foregoing, it will be manifest that the effluent and/or sludge will flow outwardly through the apertures 9, the openings formed by the notches 10 and the intervening spaces between the rests in order to obtain a maximum dispersion of the waste products into the soil. Those portions of the baffles which extend laterally outward serve to direct the effluent outwardly and away from the settling basins. It is to be understood, that in some installations the condition of the soil may be such that the baffles and/or the rests may be eliminated.

Although the structure exemplified in Figure 1 does not disclose a hook-up or connection with a septic tank or trap, it is, of course, obvious that any means for this purpose may be employed.

As illustrated in Figure 2 of the drawing, each leg or side wall of a unit 12 may be provided with a pair of horizontally disposed notches 13 which intersect and constitute terminations of the upper ends of vertical notches 14. The vertical notches 14 of one unit are arranged to cooperate with corresponding notches in an adjacent unit to provide openings for jointly receiving a baffle 15 and so that the notches 13 will receive horizontally extending lip portions 16 formed integrally along the upper edge of the baffle to assist in connecting the units together in a manner to impart stability thereto. The lip portions 16 also assist in retarding the flow of the waste matter in the system and at the same time promote settling of the sludge in the basins. As shown, the baffle is adapted to extend into the soil and outwardly between a pair of units in substantially the same manner as the baffle 11.

The structure depicted in Figure 3 of the drawing includes a baffle 17 having angular lips 18 secured to opposite sides of the upper edge portion thereof. The end edges of the unit are provided with vertical notches 19 for receiving the baffle and with horizontal notches 20 designed to receive the lips 18.

The structure exemplified in Figure 4 of the drawing is substantially the same as that of Figure 3, except that only one end edge of a unit 21 is provided with vertical and horizontal notches and a baffle 22 is provided with only one lip 23. It will be noted that the vertical notches are made to accommodate the full thickness of the baffle.

Figure 5 of the drawing illustrates the fact that a rest 24 can be formed integrally with each of the legs or side walls of a unit 25.

In Figure 6 of the drawing there is shown a portion of a unit 26 exemplifying the fact that it may include walls disposed between rests and with exterior abutments 27 on the walls which are adapted for support on the upper bearing surfaces on the rests. Although this unit is constructed of metal it is to be understood that it and the others illustrated herein may be comprised of any material suitable for the purpose intended by the invention. Each side wall of the unit 26 is preferably provided with louvered apertures 28 through which fluid may flow outwardly from the unit.

Figure 7 of the drawing illustrates a portion of a metal or moulded plastic unit indicating that the unit may include side walls depending between rests and bends or offsets formed exteriorly on the walls for support on the rests.

In view of the foregoing it will be manifest that the invention embodies improved principles of design and construction, offering advantages with respect to installation and efficiency not present in conventional tile and/or drainage systems.

It is to be understood that the units described above can be constructed of any material suitable for the purpose. It is to be further understood that use of the term "arched" is to be given a broad interpretation so as to include a unit having a pair of side walls and a top wall bridging the side walls.

Having thus described my invention, it is obvious that various modifications may be made in the same without departing from the spirit of the invention, and, therefore, I do not wish to be understod as limiting myself to the exact forms, constructions, arrangements, and combination of parts herein shown and described.

I claim:

1. An assembly for promoting drainage comprising a plurality of arch shaped units laid end to end in abutting relationship to form a passage for fluid, said units being provided with notches in their ends and baffles respectively disposed transversely in the notches between certain of the units to provide settling basins for the fluid, said baffles extending appreciable distances outwardly from the units to assist in directing fluid away from the basins.

2. A drainage system comprising a trench made in soil, two rows of spaced rests laid on the bottom of the trench, a plurality of corresponding arch shaped units laid end to end in abutting relationship and having side walls supported on the rests, said units being provided with notches in their ends and a plurality of baffles disposed in the notches between the ends of the units and rests and extending laterally into the soil defining the bottom of the trench to provide settling basins for successively receiving fluid adapted to flow in the system.

3. A drainage system comprising a trench made in soil, a plurality of corresponding arch shaped units laid end to end in abutting relationship on the bottom of the trench, said units being provided with notches in their ends and a plurality of baffles disposed in the notches between the ends of the units and extending into the soil below the units and outwardly from the units to provide settling basins for successively receiving fluid adapted to flow in the system, said baffles also assisting to direct fluid under and laterally of the units.

4. A drainage system comprising a trench made in soil, two rows of spaced rests laid on the bottom of the trench, a plurality of corresponding arch shaped units laid end to end and having side walls supported on the rests, and a plurality of baffles interposed between the ends of the units and rests and extending laterally therefrom into the soil to provide settling basins for successively receiving fluid adapted to flow in the system.

References Cited in the file of this patent

UNITED STATES PATENTS

| | | |
|---|---|---|
| 640,077 | Bagby | Dec. 26, 1899 |
| 659,464 | Blunt | Oct. 9, 1900 |
| 680,548 | Sikes | Aug. 13, 1901 |
| 836,386 | Keegan | Nov. 20, 1906 |
| 838,263 | Moore et al. | Dec. 11, 1906 |
| 980,442 | Schlafly | Jan. 3, 1911 |
| 1,394,780 | Nicholas | Oct. 25, 1921 |
| 1,490,288 | Okland | Apr. 15, 1924 |
| 1,608,889 | Lampe | Nov. 30, 1926 |